United States Patent [19]
Kawasaka

[11] Patent Number: 5,949,917
[45] Date of Patent: *Sep. 7, 1999

[54] BLOCK DISTORTION CORRECTOR AND IMAGE SIGNAL EXPANDER

[75] Inventor: Yasuki Kawasaka, Tenri, Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/612,539

[22] Filed: Mar. 8, 1996

[30] Foreign Application Priority Data

Mar. 8, 1995 [JP] Japan ................................. 7-048871

[51] Int. Cl.⁶ .............................. G06K 9/36; G06K 9/40
[52] U.S. Cl. ............................ 382/268; 382/275; 382/233
[58] Field of Search ................................. 382/268, 275, 382/239, 233; 348/420, 607, 615; 358/167

[56] References Cited

U.S. PATENT DOCUMENTS

| | | | |
|---|---|---|---|
| 5,247,363 | 9/1993 | Sun et al. | 358/167 |
| 5,337,088 | 8/1994 | Honjo | 348/420 |
| 5,359,676 | 10/1994 | Fan | 382/246 |
| 5,444,800 | 8/1995 | Kim | 382/239 |

FOREIGN PATENT DOCUMENTS

| | | | |
|---|---|---|---|
| 514735 | 7/1991 | Japan | H04N 1/41 |

*Primary Examiner*—Thomas D. Lee
*Assistant Examiner*—Wenpeng Chen

[57] ABSTRACT

A block distortion corrector for providing to recovery image data a block distortion correcting process in which a distortion of recovery image data between neighboring image blocks is corrected, the recovery image data being recovered by an expanding process from image data which are compressed and transmitted in units of image blocks corresponding to the prescribed number of pixels, includes an edge detector for detecting whether or not there exits an edge due to the distortion of the image data at a boundary to the neighboring image block by comparing with a reference value a signal level difference between image data of a to-be-processed pixel located at a boundary of neighboring image block and image data of a pixel which is located in an image block different from the image block of the to-be-processed pixel and is in the vicinity of the to-be-processed pixal. The block distortion correcting process is provided to the image data of the to-be-processed pixel located at the boundary to the neighboring image block only when the signal level difference is less than the reference value.

24 Claims, 8 Drawing Sheets

| $X_{-1-1}$ | $X_{-10}$ | $X_{-11}$ | $X_{-12}$ | $X_{-13}$ | $X_{-14}$ | $X_{-15}$ | $X_{-16}$ | $X_{-17}$ |
|---|---|---|---|---|---|---|---|---|
| $X_{0-1}$ | $X_{00}$ | $X_{01}$ | $X_{02}$ | $X_{03}$ | $X_{04}$ | $X_{05}$ | $X_{06}$ | $X_{07}$ |
| $X_{1-1}$ | $X_{10}$ | $X_{11}$ | $X_{12}$ | $X_{13}$ | $X_{14}$ | $X_{15}$ | $X_{16}$ | $X_{17}$ |
| $X_{2-1}$ | $X_{20}$ | $X_{21}$ | $X_{22}$ | $X_{23}$ | $X_{24}$ | $X_{25}$ | $X_{26}$ | $X_{27}$ |
| $X_{3-1}$ | $X_{30}$ | $X_{31}$ | $X_{32}$ | $X_{33}$ | $X_{34}$ | $X_{35}$ | $X_{36}$ | $X_{37}$ |
| $X_{4-1}$ | $X_{40}$ | $X_{41}$ | $X_{42}$ | $X_{43}$ | $X_{44}$ | $X_{45}$ | $X_{46}$ | $X_{47}$ |
| $X_{5-1}$ | $X_{50}$ | $X_{51}$ | $X_{52}$ | $X_{53}$ | $X_{54}$ | $X_{55}$ | $X_{56}$ | $X_{57}$ |
| $X_{6-1}$ | $X_{60}$ | $X_{61}$ | $X_{62}$ | $X_{63}$ | $X_{64}$ | $X_{65}$ | $X_{66}$ | $X_{67}$ |
| $X_{7-1}$ | $X_{70}$ | $X_{71}$ | $X_{72}$ | $X_{73}$ | $X_{74}$ | $X_{75}$ | $X_{76}$ | $X_{77}$ |

FIG.10 PRIOR ART

| 1 | 2 | 3 | 4 | 5 | 6 | 7 | 8 | 9 | 10 | 11 |
|---|---|---|---|---|---|---|---|---|----|----|
| 12 | 13 | 14 | 15 | 16 | 17 | 18 | 19 | 20 | 21 | 22 |
| 23 | 24 | 25 | 26 | 27 | 28 | 29 | 30 | 31 | 32 | 33 |

BLOCK DISTORTION CORRECTOR AND IMAGE SIGNAL EXPANDER

BACKGROUND OF THE INVENTION

1. Field of the Invention

The present invention relates to a block distortion corrector and an image signal expander, and more particularly to a block distortion correction processor which corrects a distortion between image blocks in an image signal expander which provides expanding processing for each image block, the correction processing being done for compressed image data which are highly compressed and encoded for each image block such that image information can be stored or transmitted as digital data.

2. Description of the Related Art

Due to a huge amount of data when digital image data are transmitted or stored, a variety of methods such as an image data encoding method which utilizes 2-dimensional orthogonal transformation formula have conventionally been devised as a method of compressing the digital image data. Among them, an encoding method which utilizes DCT (Discrete Cosine Transform) which is also utilized in H.261 (TV telephone/compression of moving pictures for TV conference), which is the International Standards, is well-known.

In a data transmission utilizing such encoding method, an input image data which consists of a plurality of pixels in matrix arrangement and corresponds to one display image is divided into image block units of 8×8 pixels on the transmission side of the image data. Then a data transformation processing using DCT, a quantization processing, and a variable-length encoding processing are performed on the input image data for each image block, and the input image data are transmitted. On the reception side of the compressed image data, an expansion processing is performed on the compressed image data for each image block divided as above. In other words, a decoding, an inverse quantization, and an inverse DCT are successively performed on the encoded data for each image block to generate a recovered image data.

When the encoding described above is being performed, if the compression rate is raised by widening the quantization step width for higher efficiency, a deterioration of a reproduced image occurs because of a linear summation of the DCT output during the inverse transformation for the pixel reproduction. Furthermore, since these expansion processes are performed in units of image blocks, there arises a problem that a distortion of the recovered image data occurs between the image blocks, notably degrading the recovered image data.

In order to reduce such block distortion, a method of alleviating the appearing of an edge at the image block boundary can be devised in which the recovered image data are processed by a low-pass filter.

A specific constitution of such method is disclosed in Japanese Laid-Open Patent Publication No. 5-14735. FIG. 7 is a block diagram describing an image expanding section of the image processor which is disclosed in the Laid-Open Publication.

Reference numeral 20 designates the image expansion section of this image processor, which is constituted such that image data which are compression-processed for each image block and transmitted are expansion-processed for each image block. The image expansion section 20 includes a decoder 21 which decodes the encoded data which is the compressed image data from the transmission side for each image block, an inverse quantization device 22 which performs an inverse quantization processing on the decoded data for each image block, and an inverse DCT device 23 which performs an inverse DCT processing on the output thereof.

The image expansion section 20 is further provided with an image buffer 24 which outputs the image data D6 of the recovered image block after having stored a necessary amount for the block distortion correction. A low-pass filter 25 as a block distortion corrector is connected to the output of the image buffer such that the image data D6 are processed for block distortion correction by the low-pass filter 25 and output.

Next, the operation of the device of FIG. 7 will be described.

First, the encoded data D1 are decoded by the decoder 21 for each image block and output to the inverse quantization device 22 as the decoded data D2. The inverse quantization process is performed on the decoded data D2 In the inverse quantization device 22, and the inverse quantization data D3 thereby obtained are output to the inverse DCT device 23. In the inverse DCT device 23, the inverse DCT processing on the inverse quantization data D3 is performed utilizing the inverse quantization data D3 and the matching data D5 from the image buffer 24, and the recovered image block data D4 are output to the image buffer 24. The image buffer 24 stores a necessary amount of the recovered image block data D4 for block distortion correction, and the data D6 for block distortion correction are supplied to the low-pass filter (the block distortion corrector) 25. In the low-pass filter 25, the block distortion correction processing of the recovered image data is performed utilizing the data D6, and post-correction recovery data D7 corrected for the block distortion are output.

However, in a method of correcting a block distortion using the above-described low-pass filter 25, there is a fundamental problem that it cannot be decided whether a discontinuity of pixel data occurring at the boundary of the image blocks processed for expansion is due to a block distortion, or it is due to the characteristics of the original image such as in the case that the luminance greatly changes in the vicinity of the boundary. For example, if a uniform block distortion correction processing is performed on recovery image data for one display screen, the filter works weakly for a part of the image of the display screen and the block distortion is not adequately removed; but the filter works too strong for another part of the image and the image in the vicinity of the block boundary blurs. These problems pose a large obstacle in improving an image quality of a recovered image.

One of the conventional image signal expander performs a block distortion correction processing while judging whether or not the block distortion correction be conducted instead of a uniform block distortion correction processing as described above. Such block distortion correction method will be described with reference to FIGS. 8 and 9.

FIG. 8 illustrates block boundary pixels of the image block subjected to a block distortion correction processing, and FIG. 9 illustrates the arrangement of other image blocks in the vicinity of the image block.

This method includes judging whether or not a block distortion correction is conducted on 28 pixels a1 (marked with "*" in the FIG. 8) which are located on the periphery of the image block A based on the image data of the image blocks adjacent to the image block a when performing the block distortion correction processing on the pixels a1.

Although the decision of whether the discontinuity of the pixel data occurring at the boundary of the image blocks is due to a block distortion or it is due to the characteristics of the original image, as in a case where the luminance greatly changes in the vicinity of the block boundary can possibly be made on the transmission side of the image data based on the image date of the original image. It is not easy on the reception side of the image data to decide whether the discontinuity of the pixel data is due to a block distortion or due to the characteristics of the original image because data representing the original image does not exist.

Consequently, if the block distortion correction is to be performed only when the values of the image data between neighboring pixel blocks are a certain value or more, as described above, in a case where the luminance greatly changes in the vicinity of the block boundary because of the characteristics of the original image, an image quality of a recovered image greatly deteriorates due to the block distortion correction processing.

Moreover, in order to realize a block distortion correction processing as illustrated in FIG. 8, it is necessary that, with respect to the image block A which is about to be in a process for block distortion correction, the image blocks B, D, F, and H in the vicinity thereof be already present as a reproduced image (FIG. 9).

In other words, the compressed image signals which are successively transmitted from the transmission side in units of image blocks are arranged, for example, from the left end to the right end in each row and from the top row to the bottom row in units of image blocks on a display screen illustrated in FIG. 10. There are a variety of other ways of sequencing the transmission of the image signals corresponding to image blocks other than the one illustrated in FIG. 10. For example, the image signals may be arranged from the top end to the bottom end and from the left column to the right column on a display screen, or they may be arranged in the same way as above except that the arrangement in the horizontal direction goes in the opposite direction or that the arrangement in the vertical direction goes in the opposite direction.

As a result, for example, if a block distortion correction on the 15th image block shown in FIG. 10 is to be made, the block distortion correction processing must wait until the compressed image signal of the 26th image block is reproduced by the axpansion processing.

That is, the block distortion correction on the 15th image block is performed after waiting for a time period necessary for image reproduction processing for eleven image blocks from the time of receiving the reproduction signal corresponding to the 15th image block.

As a result, particularly when moving picture information is being handled in data communication, a wait time until the block distortion correction is performed as described above poses a significant problem.

SUMMARY OF THE INVENTION

According to one particular aspect of the invention, a block distortion corrector for providing to recovery image data a block distortion correcting process in which a distortion of recovery image data between neighboring image blocks is corrected, the recovery image data being recovered by an expanding process from image data which are compressed and transmitted in units of image blocks corresponding to a prescribed number of pixels is provided. The block distortion corrector includes, an edge detecting section for detecting whether or not there exits an edge due to the distortion of the image data at a boundary to said neighboring image block by comparing with a reference, value a signal level difference between image data of a to-be-processed pixel located at a boundary of neighboring image block and image data of a pixel which is located in an image block different from the image block of the to-be-processed pixel and is in the vicinity of the to-be-processed pixel. In the block distortion corrector, said block distortion correcting process is provided to the image data of the to-be-processed pixel located at the boundary to the neighboring image block only when the signal level difference is less than the reference value.

According to another aspect of the present invention, a block distortion corrector further includes, a data storage section for storing recovery image data of a pixels adjacent to to-be-corrected image block, the recovery image data being of a neighboring image block recovered before the to-be-corrected image block is recovered, the neighboring image block being adjacent to the to-be-corrected image block on which a block distortion correction processing of the recovery image data is about to be performed, and arithmetic processing means for providing an arithmetic processing for a block distortion correction processing to recovery image data of pixels located at a boundary to the neighboring image block, said pixels being of the to-be-corrected image block, using the image recovery data stored in the data storage section.

According to still another aspect of the present invention, an image signal expander includes, an expanding processing section for making recovery image data by providing an expanding processing to image data which are compressed and transmitted in units of image blocks corresponding to the prescribed number of pixels, and a block distortion corrector for providing to the recovery image data a block distortion correction processing for correcting a distortion of recovery image data between neighboring image blocks. In the image signal expander, the block distortion corrector includes an edge detecting section for detecting whether or not there exits an edge due to the distortion of the image data at a boundary to the neighboring image block by comparing with a reference value a signal level difference between image data of a to-be-processed pixel located at a boundary of neighboring image block and image data of a pixel which is located in an image block different from the image block of the to-be-processed pixel and is in the vicinity of the to-be-processed pixel, the block distortion correcting process is provided to the image data of the to-be-processed pixel located at the boundary to the neighboring image block only when said signal level difference is less than the reference value.

According to still another aspect of the present invention, an image signal expander further includes, a data storage section for storing recovery image data of pixels adjacent to to-be-corrected image block, the recovery image data being of a neighboring image block recovered before the to-be-corrected image block is recovered. The neighboring image block being adjacent to the to-be-corrected image block on which a block distortion correction processing of the recovery image data is about to be performed. An arithmetic processing section for providing an arithmetic processing for a block distortion correction processing to recovery image data of pixels located at a boundary to the neighboring image block, the pixels being of the to-be-corrected image block, using the image recovery data stored in the data storage section.

Thus, the invention described herein makes possible the advantage of providing a block distortion corrector and an image signal expander which eliminate an unnecessary wait time until a block distortion correction is performed on the reception side of the image data, thereby efficiently performing a block distortion correction.

This and other advantages of the present invention will become apparent to those skilled in the art upon reading and understanding the following detailed description with reference to the accompanying figures.

BRIEF DESCRIPTION OF THE DRAWINGS

FIG. 10 is a schematic diagram illustrating an address map of the image block corresponding to one display screen when the image data of one display screen are partitioned into image blocks, each of which has the prescribed number of pixels, and transmitted.

DESCRIPTION OF THE PREFERRED EMBODIMENTS

First, the fundamental principle of the present invention will be described with reference to FIGS. 2 and 5.

Figure 5:
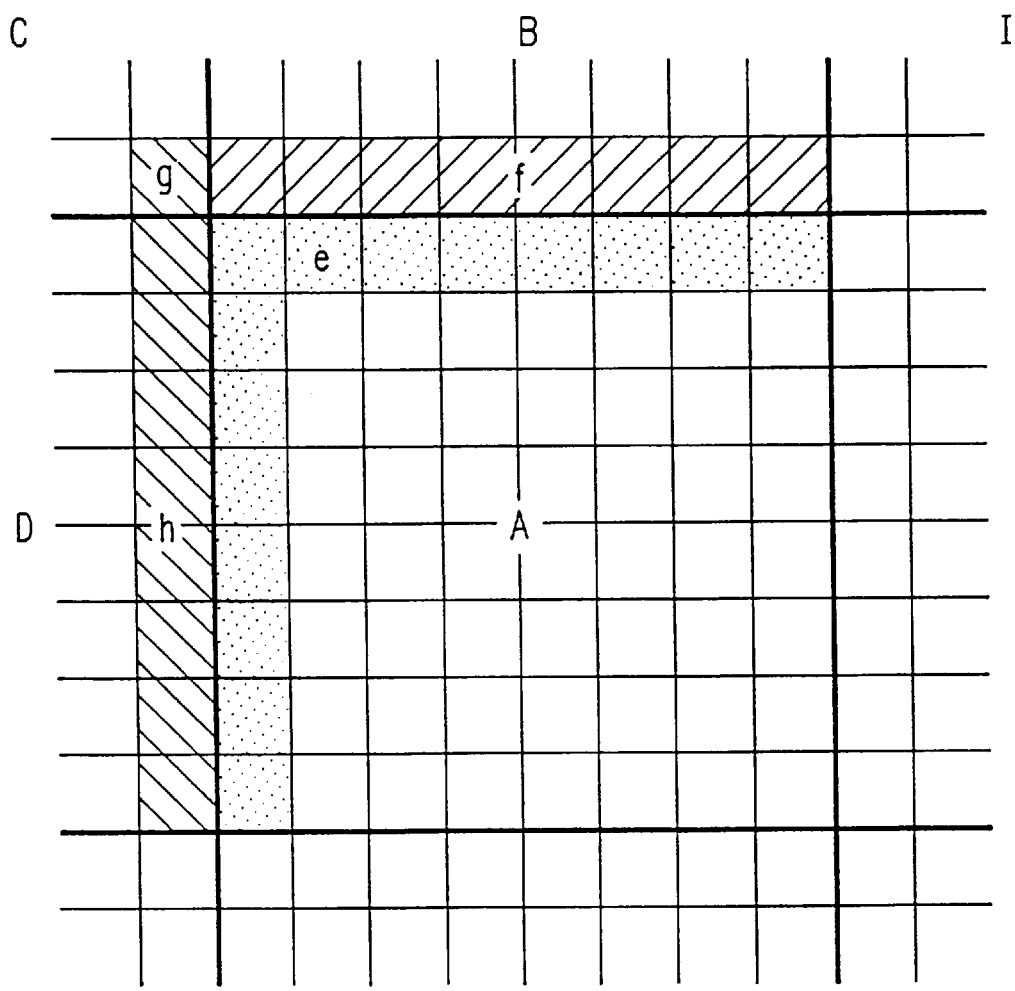
FIG. 5 is a diagram schematically illustrating the image block to be processed for block correction and the pixel region of the image block on the periphery thereof in the block distortion corrector of the present example.

FIG. 5 illustrates the arrangement of the reproduction image block (8×8 pixels) when the image data are recovered (hereinafter, also referred to as "being reproduced" where appropriate) in units of image blocks in the order shown in FIG. 10. In FIG. 5 A designates the reproduction image block which is to be processed for block distortion correction; B designates the reproduction image block which is in contact with the upper side of the reproduction image block A; D designates the reproduction image block which is in contact with the left side of the reproduction image block A; and C designates the reproduction image block which is in contact with the upper left corner of the reproduction image block A. The reproduction image blocks B to D are already finished for the reproduction of their image data at the time of reproduction of the image data of the image block A.

Figures 2, 3:
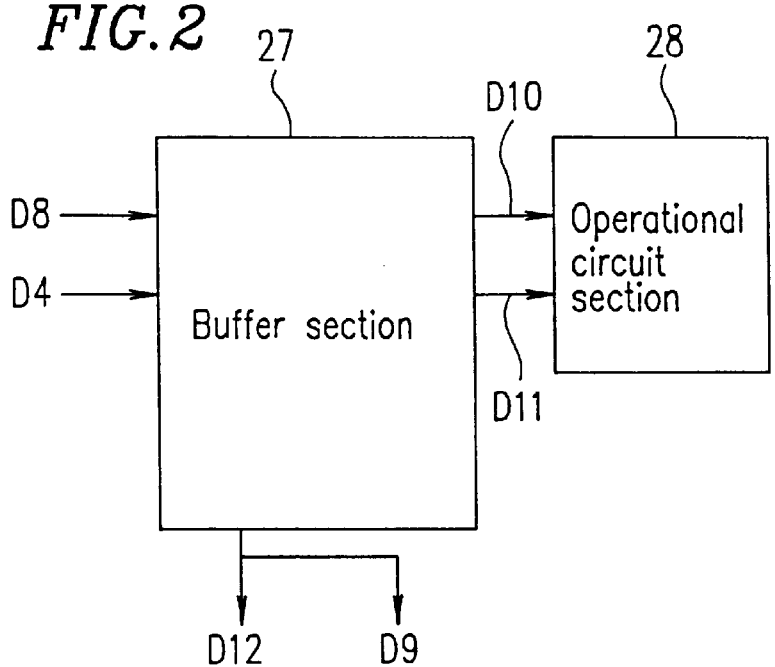
FIG. 2 is a block diagram illustrating an outline of a configuration of a block distortion corrector of the image signal expander of the example.
FIG. 3 is a schematic view illustrating a memory map of the buffer section of the block distortion corrector in the image signal expander of the example.

FIG. 2 is a diagram illustrating the main part of the circuit configuration for block distortion corrector of the present invention, where reference numeral 27 designates a buffer section which stores recovery image data (hereinafter, also referred to as reproduction image data where appropriate). Reference numeral 28 designates an operational circuit section which performs a block distortion correction processing on the image data in the designated region of the reproduction image block based on the image data which are stored in the buffer section 27.

In the present invention, a block distortion correction of the reproduction image block A is performed while the pixel data in the regions f, g, and h of the reproduction image blocks B, C, and D, respectively, (which are all in the vicinity of the reproduction image block a and already reproduced), are stored in the buffer 27 together with the pixel data in the region a of the reproduction image block A, thereby conducting an edge decision an the pixels in these regions e to h.

Therefore, in the present invention, the fundamental circuit configuration for performing a block distortion correction becomes very simple such that it consists of the buffer section 27 which stores the image data in the regions e to h of respective reproduction image blocks and the operational circuit section 28 which conducts an operation for the block distortion correction based on the image data which are stored in the buffer section 27.

Hereinafter, an example of the present invention will be described.

Figure 1:
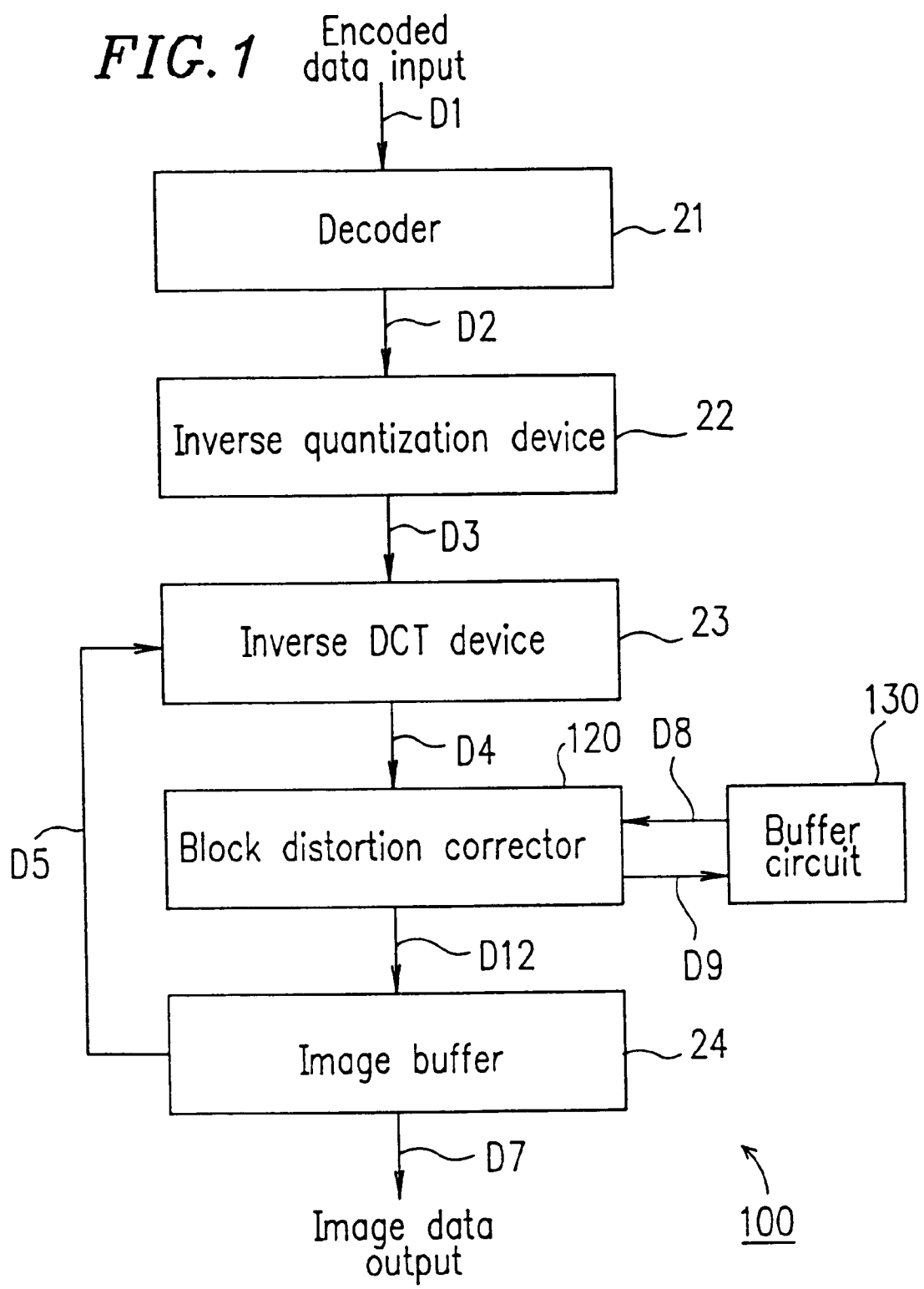
FIG. 1 is a block diagram illustrating an outline of a configuration of an image signal expander according to an example of the present invention.
Figure 7:
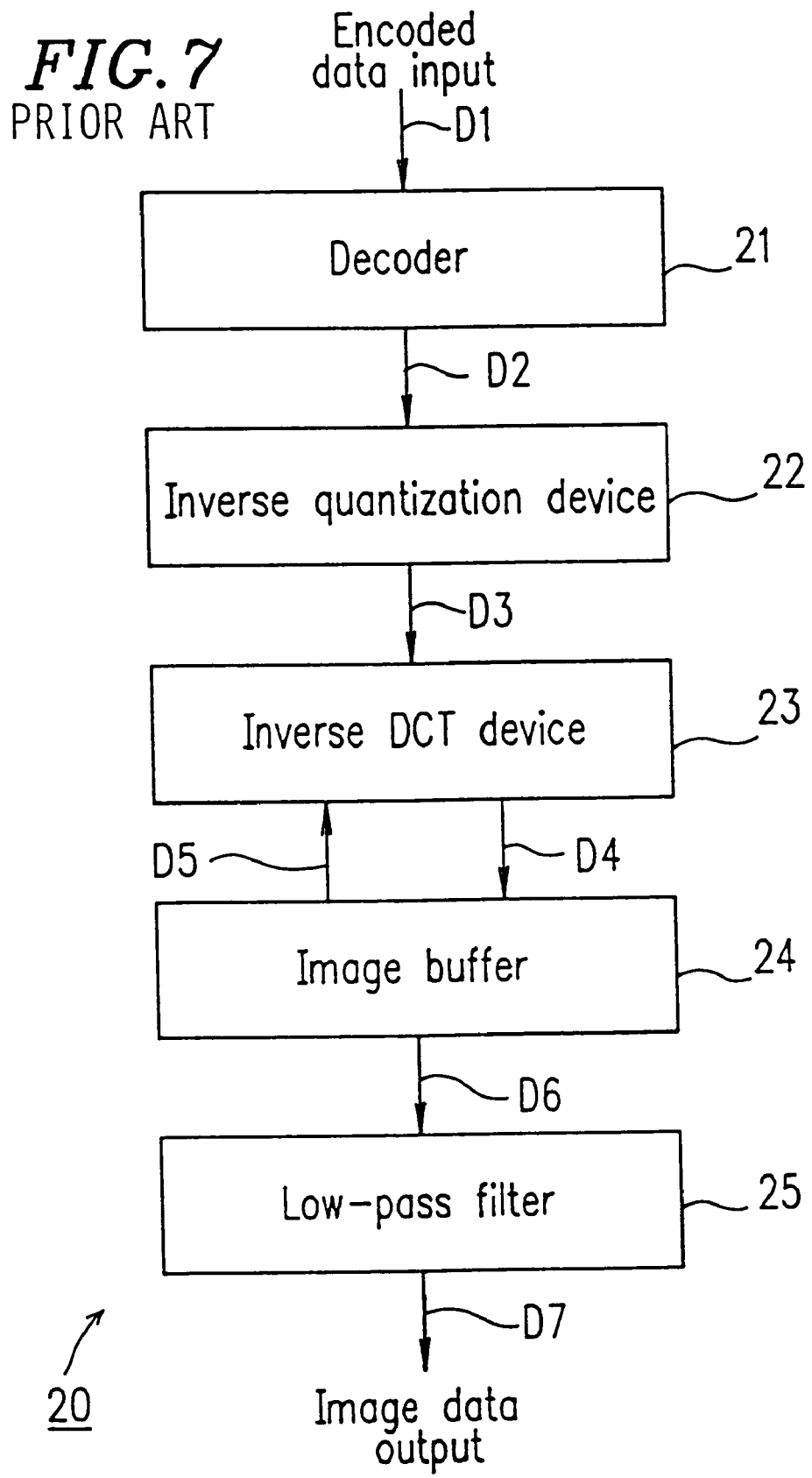
FIG. 7 is a block diagram illustrating an outline of a configuration of a conventional image signal expander.

FIG. 1 is a block diagram illustrating an outline of the configuration of an image signal expander according to one example of the present invention. In the figure, reference numeral 100 designates the image signal expander of the present invention in conformity with H.261, and the same reference numerals used in FIG. 7 designate the same parts of the conventional image signal expander. The image signal expander 100 includes a buffer circuit 130 and a block distortion corrector 120. The buffer circuit 130 stores the correction data D9 for performing a block distortion correction and the block distortion corrector 120 receives the recovered image date D4 corresponding to each image block and output from the inverse DCT device 23 and performs a block distortion correction processing while conducting an edge detection on the pixel data in a designated region of the image block based on the correction data D8 stored in the buffer circuit 130.

Figure 4:
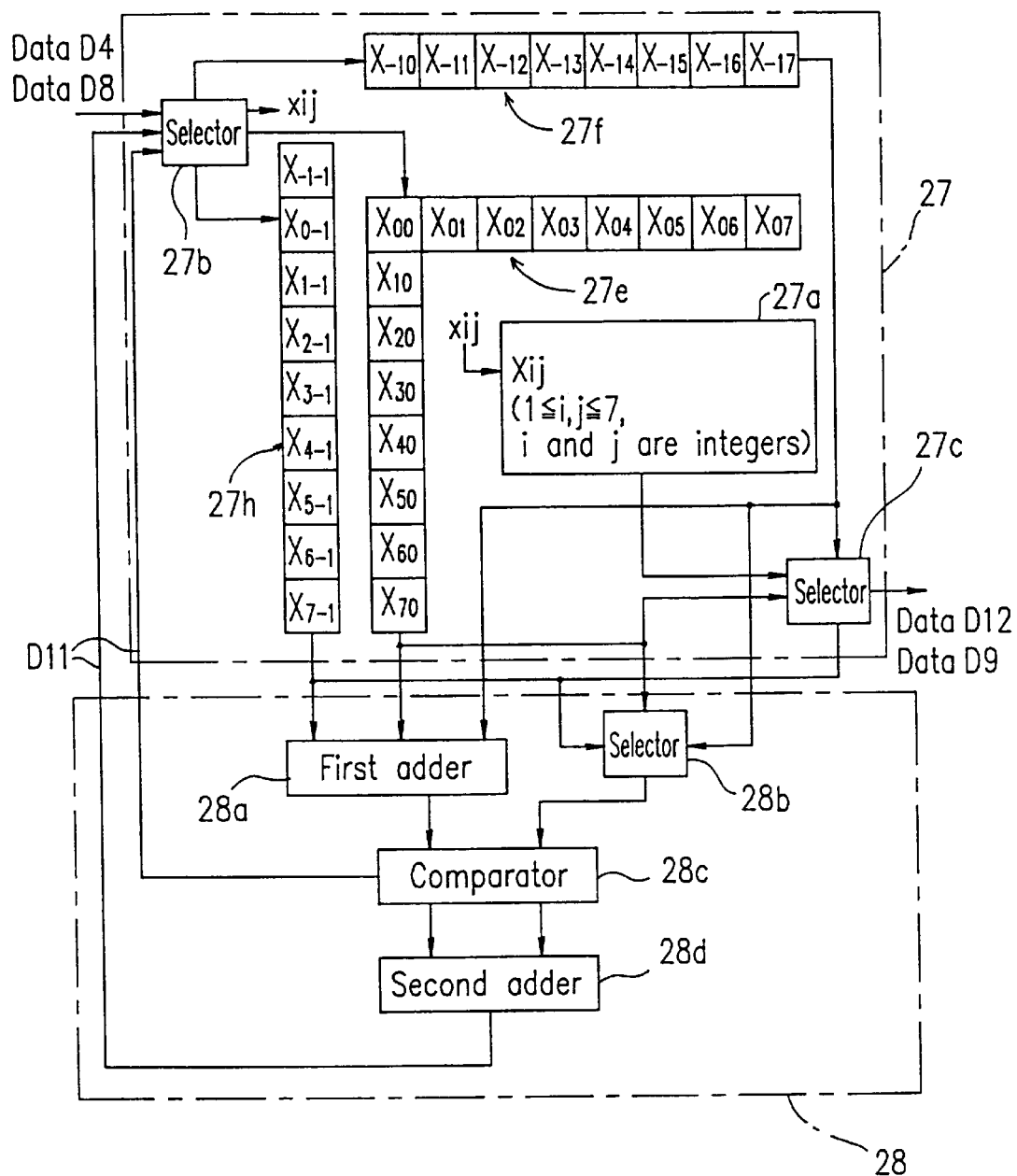
FIG. 4 is a diagram illustrating a specific configuration of the block distortion corrector in the image signal expander of the example.

FIG. 4 specifically illustrates the configuration of the buffer section 27 and the operational circuit section 28 which are provided within the block distortion corrector 120.

Figures 8, 9:
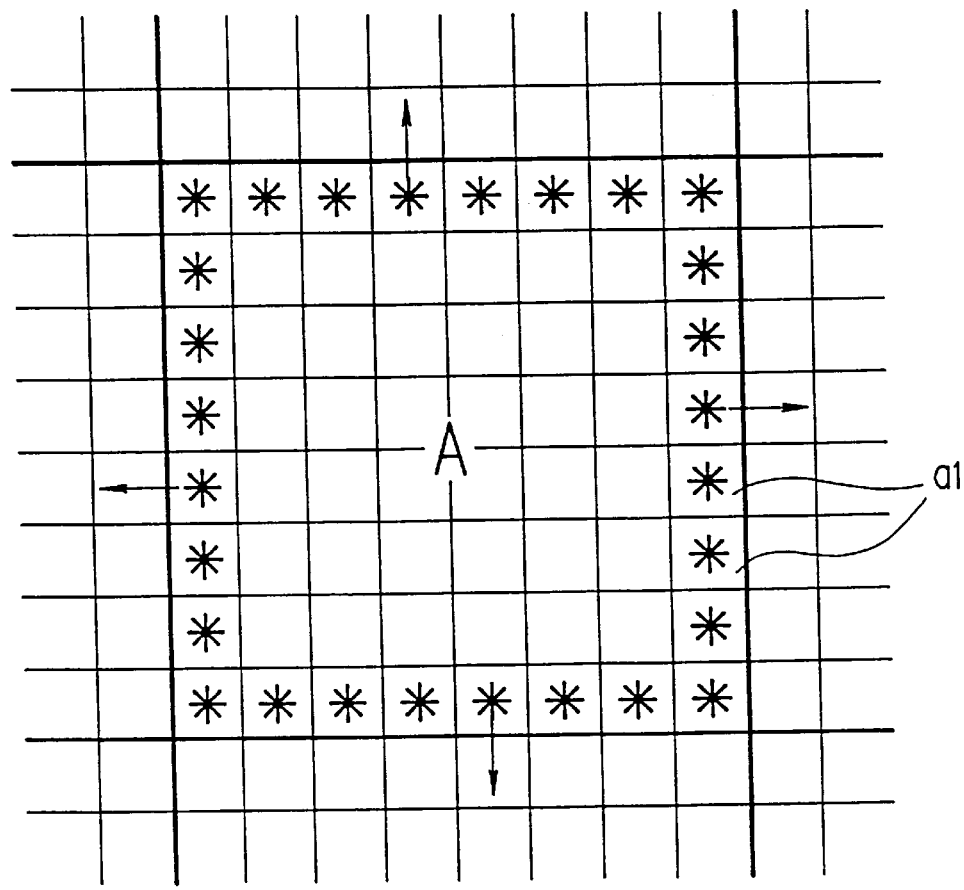
FIG. 8 is a schematic view illustrating block boundary pixels to be processed for block distortion correction in the block distortion corrector of the conventional image signal expander.
FIG. 9 is a schematic diagram illustrating an image block to be processed for block distortion correction and the image blocks in the vicinity thereof in a conventional block distortion correction method.

The buffer circuit 130 stores, if FIG. 9 is taken as an example, image data of the image blocks of one horizontal row to which the reproduction image blocks C, B, and I belong. Moreover, also referring to FIG. 5, the buffer section 27 includes a first buffer 27e which stores pixel data of the region e of the reproduction image block A, a second buffer 27f which stores pixel data of the region f of the reproduction image block B, a third buffer 27h which stores pixel data of the regions h and g of the reproduction image blocks D and C, respectively, and a fourth buffer 27a which stores pixel data of the region of the reproduction image block A other than the region e.

On the input side of the buffer section 27, a first selector 27b is provided which selects among the image data D4 from the inverse DCT device 23, the correction data D8 from the buffer circuit 130, and the image data D11 for correction from the operational circuit section 28, and supplies them to the buffers 27a, 27e, 27f, and 27h. On the output side of the buffer section 27, a second selector 27c is provided which selects among the image data stored in the buffers 27a, 27e, 27f, and 27h and outputs them to the image buffer 24 as the corrected recovery image block data D12 or to the buffer circuit 130 as the correction data D9.

Here, $X_{ij}$ ($-1 \leq i$, $j \leq 7$,; i and j are integers) designates a storage region of the image data in each of the buffer. For reasons of convenience, the pixel data stored in the storage region $X_{ij}$ ($-1 \leq i$, $j \leq 7$,; i and j are integers) are hereinafter referred to as $x_{ij}$ ($-1 \leq i$, $j \leq 7$,; i and j are integers).

The operational circuit section 28 includes a third selector 28b which selects among the image data from the buffers 27e, 27f, and 27h, a first adder 28a which adds the image data from the buffers 27e, 27f, and 27h, a comparator 28c which compares the output from the third selector 28b with the output from the first adder 28a, and a second adder 28d which receives the output from the first adder 28a and the output of the third selector 28b via the comparator 28c and performs a prescribed adding operation of image data.

Next, the operation will be described.

First, when encoded data D1 are input to the decoder 21 from an external device, the decoding of the data is performed in the decoder 21, and the decoded data D2 are supplied to the inverse quantization device 22. The inverse quantization of the decoded data D2 is performed in the inverse quantization device 22, and the inverse quantization data D3 are supplied to the inverse DCT device 23. In this inverse DCT device 23, the inverse DCT processing on the inverse quantization data D3 is performed based on the prescribed image data D5 from the image buffer 24, and the corresponding image data D4 of the recovery image block (recovery image block data) are produced.

Then, the recovery image block data D4 are supplied to the block distortion corrector 120 from the inverse DCT device 23, and the correction data D8 for the periphery of the recovery image block (block periphery data) are supplied from the buffer circuit 130.

Here, the image data D4 refers to the pixel data of the image block A encircled by a bold line in FIG. 5, and the block periphery data D8 refer to the pixel data of the region f of the image block a illustrated in FIG. 5.

Next, the data storage processing in the buffer section 27 will be described.

FIG. 3 illustrates a memory map of the buffer section 27. As described above, the first buffer 27e has storage regions $X_{0j}$ ($0 \leq j \leq 7$; j is an integer) and $X_{i0}$ ($0 \leq i \leq 7$; i is an integer). Similarly, the second buffer 27f has a storage region $X_{-1j}$ ($0 \leq j \leq 7$; j is an integer), and the third buffer 27h has a storage region $X_{i-1}$ ($-1 \leq i \leq 7$; i is an integer). Also, the fourth buffer 27a has a storage region $X_{ij}$ ($1 \leq i, j \leq 7$; i and j are integers).

The block periphery data D8 are stored in the storage region $X_{-1j}$ ($0 \leq j \leq 7$; j is an integer) of the buffer 27f, and the recovery image block data D4 are stored in the storage regions $X_{0j}$ ($0 \leq j \leq 6$; j is an integer) and $X_{i0}$ ($1 \leq i \leq 7$; i is an integer) of the buffer 27e and the storage region $X_{ij}$ ($1 \leq 7$, $1 \leq j \leq 6$; i and j are integers) of the buffer 27a. Furthermore, the recovery image block date $x_{i7}$ ($-1 \leq i \leq 7$; i is an integer) which were stored immediately prior in the storage region $X_{i7}$ ($-1 \leq i \leq 7$; i is an integer) are copied in the storage region $X_{i-1}$ ($-1 \leq i \leq 7$; i is an integer) of the buffer 27h.

In the block distortion correction processing, the data transfer between the buffer section 27 and the operational circuit section 28 is conducted. The flow of data for this data transfer will be described for the case where the pixel data which are to be processed for correction are $x_{2-1}$ and $x_{20}$ stored in the storage regions $X_{2-1}$ and $X_{20}$, respectively, as an example. Here, the image data $x_{ij}$ ($-1 \leq i, j \leq 7$; i and J are integers) stored in the storage region $X_{ij}$ ($-1 \leq i, j \leq 7$; i and j are integers) correspond to the individual pixel in each image block, and for reasons of convenience, the storage region $X_{i,j}$ ($-1 \leq i, j \leq 7$; i and j are integers) are, hereinafter, also referred to as pixels.

First, the buffer section 27 supplies the pixel data D10 to the operational circuit section 28. This pixel data D10 include the image data $x_{2-1}$ and $x_{20}$ of the pixel $X_{2-1}$ and $X_{20}$ which are subjected to the correction processing and the image data $x_{1-1}$, $x_{2-1}$, $x_{3-1}$, $x_{10}$, $x_{20}$, and $x_{30}$ of the pixels located above and below in the vicinity thereof $X_{1-1}$, $X_{2-1}$, $X_{3-1}$, $X_{10}$, $X_{20}$, and $X_{30}$, respectively. If a block distortion correction between the pixels $X_{-1j}$ and $X_{0j}$ ($0 \leq j \leq 7$; j is an integer) is to be performed, a set of pixel data for correction processing is made with respect to th pixels on the left and right in the vicinity of the pixels $X_{-1j}$ and $X_{0j}$ ($0 \leq j \leq 7$; j is an integer) which are being subjected to the correction.

in the operational circuit section 28, the existence of an edge is decided by a following algorithm, and a block distortion correction is performed based on this decision.

The first adder 28a of the operational circuit section 28 conducts an operation illustrated in equations (1) and (2) below based on the image data D10 which are supplied from the first, second, and third buffers 27e, 27f, and 27h of the buffer section 27, thereby generating a pixel value for the edge decision.

$$x_{20}' = (x_{1-1} + x_{2-1} + x_{3-1})/3 \tag{1}$$

$$x_{2-1}' = (x_{10} + x_{20} + x_{30})/3 \tag{2}$$

Here, $x_{20}'$ is a pixel value for comparison to be compared to the pixel data $x_{20}$, and $x_{2-1}'$ is a pixel value for comparison to be compared to the pixel data $x_{2-1}$.

Next, in the comparator 28c of the operational circuit section 28, a signal level difference between the pixel value for comparison $x_{20}'$ and the pixel data $x_{20}$ is compared to the threshold value (reference value) $\alpha$, and a signal level difference between the pixel value for comparison $x_{2-1}'$ and the pixel data $x_{2-1}$ is compared to a threshold value (reference value) $\alpha$, thereby performing an edge decision with respect to each of the pixel data $x_{20}$ and $x_{2-1}$.

How to determine the threshold value (reference value) $\alpha$ is described below. The threshold value $\alpha$ is set so as to have a value which enables obtaining a processed image having better quality by trial and error. The trial and error process includes a stop of setting the threshold value $\alpha$ to a certain value, a step of performing the above-mentioned operation, a step of evaluating the processed image, and a step of varying the threshold value $\alpha$.

If an inequality $|x_{20}' - x_{20}| < \alpha$ (the threshold value) is satisfied, then it is decided that an edge exists and the pixel value for comparison $x_{20}'$ and the pixel data $x_{20}$ are supplied to the second adder 28d. Upon receiving them, the second adder 28d conducts an operation illustrated in equation (3) below for the pixel value for comparison $x_{20}'$ and pixel data $x_{20}$ from the comparator 28c to produce a pixel data for distortion correction $x_{20}''$ for the pixel data $x_{20}$, which are supplied back to the storage region $X_{20}$ of the buffer section 27.

$$x_{20}'' = (x_{20} + x_{20}')/2 \tag{3}$$

If the inequality is not satisfied, then it is decided that an edge does not exist, and the pixel data for distortion correction $x_{20}$" is replaced by the pixel data $x_{20}$ (i.e., $x_{20}$"=$x_{20}$) and supplied back to the storage region $X_{20}$ of the buffer section 27. In other words, the distortion correction for the pixel data $x_{20}$ is not performed.

Similarly, if an inequality $|x_{2-1}'-x_{1-1}|<\alpha$ (the threshold value) is satisfied, than it is decided that an edge exists and the pixel value for comparison $x_{2-1}'$ and the pixel data $x_{2-1}$ are supplied to the second adder 28$d$. Upon receiving them, the second adder 28$d$ conducts an operation defined by equation (4) below for the pixel value for comparison $x_{2-1}'$ and the pixel data $x_{2-1}$ from the comparator 28$c$ to produce a pixel data for distortion correction $x_{2-1}$" for the pixel data $x_{2-1}$, which are supplied back to the storage region $X_{2-1}$ of the buffer section 27.

$$x_{2-1}"=(x_{2-1}+x_{2-1}')/2 \tag{4}$$

On the other hand, if the inequality is not satisfied, then it is decided that an edge does not exist, and the pixel data for distortion correction $x_{2-1}$" is replaced by the pixel data $x_{2-1}$ (i.e., $x_{2-1}$"=$x_{2-1}$) and supplied back to the storage region $X_{2-1}$ of the buffer section 27. In other words, the distortion correction for the pixel data $x_{2-1}$ is not performed.

Figure 6:
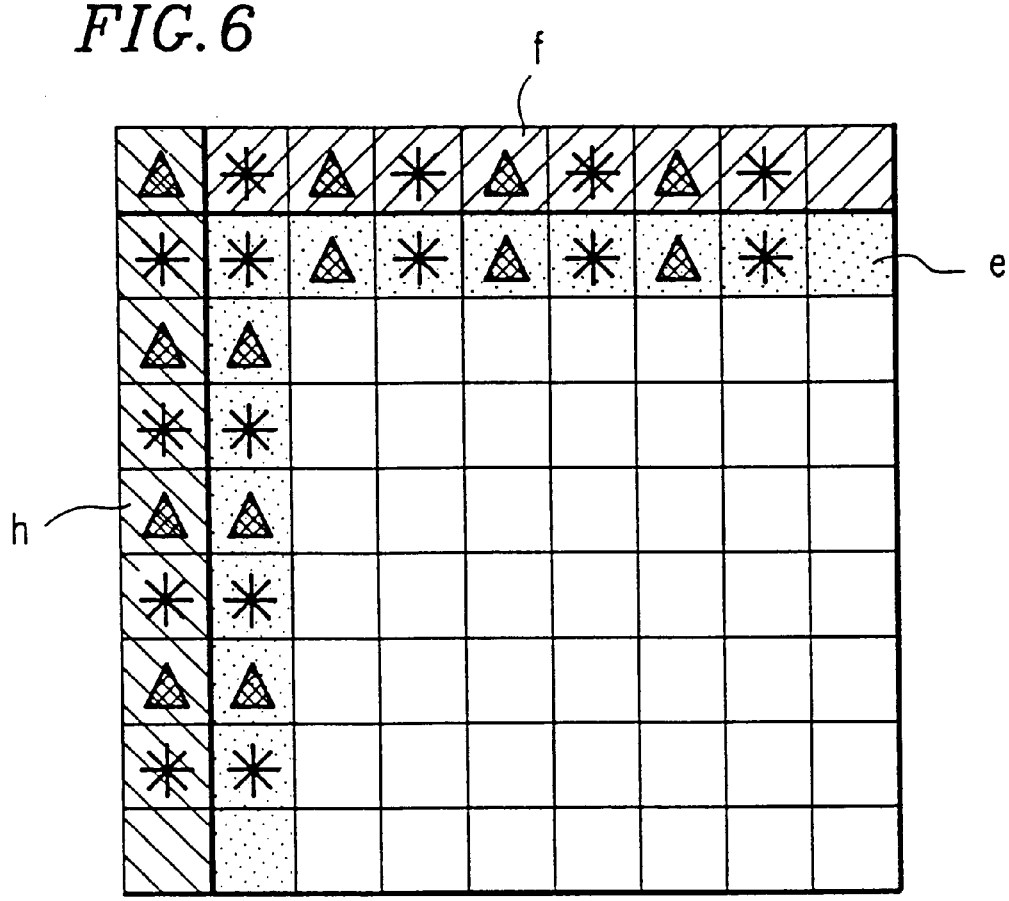
FIG. 6 is a schematic diagram illustrating the block distortion correction processing in progress in the storage region (pixel region) of the buffer section of the block distortion corrector.

If a chain of above processes of making the edge decision by the algorithm and then sending the image data for distortion correction $x_{20}$" and $x_{2-1}$" back to the buffer 27 is completed for the pixel data $x_{-10}$, $x_{-12}$, $x_{-14}$, $x_{-16}$, $x_{00}$, $x_{02}$, $x_{04}$, $x_{06}$, $x_{20}$, $x_{40}$, $x_{60}$, $x_{0-1}$, $x_{2-1}$, $x_{4-1}$, and $x_{6-1}$, then the block distortion correction processing for the pixels $X_{-1j}$ and $X_{0j}$ (j=0, 2, 4, 6), $X_{i0}$ (i=2, 4, 6), and $X_{i-1}$ (i=0, 2, 4, 6) in the regions e, f, and h in FIG. 5, which are all marked with "*", is performed as illustrated in FIG. 6.

Next, a block distortion correction is performed for the pixels which are marked with "Δ" in FIG. 6. For the pixels $X_{-ij}$ and $X_{0j}$ (j=1, 3, 5) marked with "Δ", the pixels marked with "*" on the left and right in the vicinity thereof are used, and for the pixels $X_{i-1}$ and $X_{i0}$ (i=1, 3, 5), the pixels marked with "*" above and below in the vicinity thereof are used, and furthermore for the pixel $X_{-1-1}$ marked with "Δ", the pixels marked with "*" in the vicinity thereof are used, when performing the block distortion correction by an algorithm below.

Hereinafter, the case where the pixels to be corrected are $X_{3-1}$ and $X_{30}$ will be described. In the following description, $x_{3-1}$" and $x_{30}$" are pixel data for distortion correction corresponding to the pixel data $x_{3-1}$ and $x_{30}$, respectively.

In the comparator 28$c$, an edge decision for the pixel data $x_{3-1}$ and $x_{30}$ is conducted by comparing pixel data which are coming in from the first and the third buffers 27$e$ and 27$h$ via the selector 28$b$.

If an inequality $|x_{20}-x_{40}|<\alpha$ (the threshold value) is satisfied, then it is decided that an edge exists and the pixel data $x_{20}$, $x_{30}$, and $x_{40}$ are supplied to the second adder 28$d$. Upon receiving them, the second adder 28$d$ conducts an operation illustrated in equation (5) below for the pixel data $x_{20}$, $x_{30}$, and $x_{40}$ to produce the pixel data for distortion correction $x_{30}$" for the pixel data $x_{30}$, which are supplied back to the storage region $X_{30}$ of the buffer section 27.

$$x_{30}"=(x_{20}+x_{30}+x_{40})/3 \tag{5}$$

On the other hand, if the inequality is not satisfied, then it is decided that an edge does not exist, and the pixel data for distortion correction $x_{30}$" is replaced by the pixel data $x_{30}$ (i.e., $x_{30}$"=$x_{30}$) and supplied back to the storage region $X_{30}$ of the buffer section 27. In other words, the distortion correction for the pixel data $x_{30}$ is not performed.

Similarly, if an inequality $|x_{2-1}-x_{4-1}|<\alpha$ (the threshold value) is satisfied, then it is decided that an edge exists and the pixel data $x_{2-1}$, $x_{3-1}$, and $x_{4-1}$ are supplied to the second adder 28$d$. Upon receiving them, the second adder 28$d$ conducts an operation illustrated in equation (6) below for the pixel data $x_{2-1}$, $x_{3-1}$, and $x_{4-1}$ from the comparator 28$c$ to produce the pixel data for distortion correction $x_{3-1}$" for the pixel data $x_{3-1}$, which are supplied back to the storage region $X_{3-1}$ of the buffer section 27.

$$x_{3-1}"=(x_{2-1}+x_{3-1}+x_{4-1})/3 \tag{6}$$

On the other hand, if the inequality is not satisfied, then it is decided that an edge does not exist, and the pixel data for distortion correction $x_{3-1}$" is replaced by the pixel data $x_{3-1}$ (i.e., $x_{3-1}$"=$x_{3-1}$) and supplied back to the storage region $X_{3-1}$ of the buffer section 27. In other words, the distortion correction for the pixel data $x_{3-1}$ is not performed.

Finally, the case where a pixel which is to be corrected is $X_{-1-1}$ will be described. In the following description, $x_{-1-1}$" is the pixel data for distortion correction corresponding to the pixel data $x_{-1-1}$.

In the comparator 28$c$, an edge decision for the pixel data $x_{-1-1}$ is conducted by comparing pixel data which are from the first, second, and third buffers 27$e$, 27$f$, and 27$h$.

If an inequality $|x_{0-1}-x_{-10}|<\alpha$ (the threshold value) is satisfied, then it is decided that an edge exists and the pixel data $x_{0-1}$, $x_{-1-1}$, and $x_{-10}$ are supplied to the second adder 28$d$. Upon receiving them, the second adder 28$d$ conducts an operation illustrated in equation (7) below for the pixel data $x_{0-1}$, $x_{-1-1}$, and $x_{-10}$ from the comparator 28$c$ to produce the pixel data for distortion correction $x_{-1-1}$" for the pixel data $x_{-1-1}$, which are supplied back to the storage region $X_{-1-1}$ of the buffer section 27.

$$x_{-1-1}"=(x_{0-1}+x_{-1-1}+x_{-10})/3 \tag{7}$$

On the other hand, if the inequality is not satisfied, then it is decided that an edge does not exist, and the pixel data for distortion correction $x_{-1-1}$" is replaced by th pixel data $x_{-1-1}$ (i.e., $x_{-1-1}$"=$x_{-1-1}$) and supplied back to the storage region $X_{-1-1}$ of the buffer section 27. In other words, the distortion correction for the pixel data $x_{-1-1}$ is not performed.

If the distortion correction processing such as above is performed for the image data in the regions e, f, and h illustrated in FIG. 5, the pixel data $x_{ij}$ ($-1 \leq i,j \leq 6$; i and J are integers) are output to the image buff for 24 as the correction recovery image block data D12. At the same time, the pixel data $x_{i7}$ ($-1 \leq i \leq 7$; i is an integer) are copied in the pixels $X_{i-1}$ ($-1 \leq i \leq 7$; i is an integer), respectively, and the pixel data $x_{7j}$ ($0 \leq j \leq 6$; j is an integer) are supplied to the buffer circuit 130 as the correction data D9.

If these processes are performed for the image data D4 of the entire recovery image blocks, producing each correction recovery image block data D12 and supplying them to the image buffer 24, then one recovery image is completed in the image buffer 24. This completed is distortion correction recovery image data D7 is displayed on an external display device or the like.

In the present example as described above, the signal level difference between the image data of a to-be-processed pixel (or a pixel which is being processed) which is located at the boundary to a neighboring image block and the image data of pixels which are in a image block different from the one in which the to-be-processed pixel is located and are in the vicinity of the to-be-processed pixel is compared to a reference value α, and it is decided whether or not there exists an edge at the boundary to the neighboring image block due to a distortion of the image data. And, only when the signal level difference is less than the reference value, the block distortion correction processing is performed for the image data of the to-be-processed pixel which is located at the boundary to the neighboring image block. Therefore, when the discontinuity of pixel data occurring at the image block boundary is more than a fixed reference, a block distortion correction is not performed regardless of whether the discontinuity is due to the block distortion or it is due to the characteristics of the original image. The block distortion correction of the image data is performed only when the discontinuity of pixel data is less than a fixed reference.

Accordingly, by setting the reference value a while taking into consideration the signal level difference of the image data between neighboring image blocks which manifests itself as a block distortion, it is possible to detect most of the edges due to a block distortion. Moreover, since a signal level difference of image data due to a block distortion which is greater than the above-mentioned reference value and is almost equal to that when a luminance greatly changes in the vicinity of a block boundary because of the characteristics of the original image is less likely to occur than the signal level difference of the image data due to a block distortion which is less than the above-mentioned reference value, a block distortion correction can be performed by a simple circuit configuration while preventing the degradation of an image quality of a recovery image due to a block distortion correction processing, i.e., preventing a blurring of an image as a whole, thereby reproducing a clear image.

Furthermore, recovery image data of pixels which are adjacent to a to-be-processed image block, the recovery image data being those of neighboring image blocks which are adjacent to the to-be-corrected image block for which a block distortion correction processing of recovery image data is to be performed and have already been recovered before the recovery of the to-be-corrected image block, are used to carry out an operational processing for a block distortion correction processing for recovery pixel data of the pixels which are in the to-be-corrected image block and are located at the boundary to the neighboring image block. Therefore, for the image date of the reproduction block A in FIG. 5 for example, a block distortion correction processing can successively be performed for the image block for which the image data are reproduced without waiting for the image data of the reproduction image blocks B to D to be reproduced. As a result, time required for the signal processing for the reproduction of the image date can considerably be reduced on the reception side of the image data which are signal-compressed for each image block and transmitted, and a fast signal processing can be realized.

In the above-described example, the operational circuit section 28 of the block distortion corrector 120 is constituted so as to perform an operation for a distortion correction by utilizing equations (1), (2), (5), (6), and (7). However, a general arithmetic operation equation for distortion correction is such that the summation of image data is performed with coefficients a, b, and. c (a, b, c>0) assigned to the image data $x_1$, $x_2$, and $x_3$, respectively, to weigh the variables as shown in equation (8) below. Accordingly, the above-mentioned block distortion correction device can be constituted so as to perform the adding operation using equation (8) below. In that case, it is desirable to have a configuration such that the value of the above-mentioned coefficients a, b, and c can be controlled from outside the block distortion correction device.

$$x' = (ax_1 + bx_2 + cx_3)/(a+b+c) \quad (8)$$

Moreover, the buffer section 27 can be ouch that the memory capacity of the image data storage region is of the minimum memory capacity for storing only the image date of the regions a, f, g, and h shown in FIG. 5. The coefficients a, b, and c depend on a characteristics of an image to be processed. Therefore, it is preferable to optimize these coefficients based on statistical analysis, thereby obtaining a processed image having better image quality.

As described above, according to the present invention, a block distortion corrector includes an edge detection section which compares the signal level difference between the image data of to-be-processed pixel which is located at the boundary to a neighboring image block and the image data of pixels which are in a image block different from the one in which the to-be-processed pixel is located and are in the vicinity of the to-be-processed pixel to a reference value to detect whether or not there exists an edge at the boundary to the neighboring image block duo to a distortion of the image data. And, only when the signal level difference is less than the reference value, the block distortion correction processing is performed on the image data of the to-be-processed pixel which is located at the boundary to the neighboring image block. Therefore, by setting the reference value while taking into consideration the signal level difference of the image data between neighboring image blocks which manifests itself as a block distortion, it is possible to detect most of the edges due to a block distortion.

Moreover, since a signal level difference of image data due to a block distortion which is greater than the above-mentioned reference value and is almost equal to that when a luminance greatly changes in the vicinity of a block boundary because of the characteristics of the original image is loss likely to occur than the signal level difference of the image data due to a block distortion which is less than the above-mentioned reference value, an effect that a block distortion correction can be performed by a simple circuit configuration without having a blurring of an image as a whole, thereby reproducing a clear image.

According to the present invention, recovery image data of pixels which are adjacent to a to-be-processed image block, the recovery image data being those of neighboring image blocks which are adjacent to the to-be-corrected image block for which a block distortion correction processing of recovery image data is to be performed and have already boon recovered before the recovery of the to-be-corrected image block, are used to carry out an operational processing for a block distortion correction processing for recovery pixel data of the pixels which are in the to-be-corrected image block and are located at the boundary to the neighboring image block. Therefore, when performing a block distortion correction processing for the to-be-corrected image block, it is no longer necessary to wait for the image data of other image blocks to be recovered. As a result, time required for the signal processing for the reproduction of the image data can considerably be reduced on the reception side of the image data, and a fast signal processing can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A block distortion corrector for providing, to recovery image data, a block distortion correcting process in which a distortion of said recovery image data between neighboring image blocks is corrected, said recovery image data being recovered by an expanding process from image data which are compressed and transmitted in units of image blocks corresponding to a prescribed number of pixels, the expanding process and the block distortion correction process being applied in a predetermined order, comprising:

edge detecting means for detecting whether or not there exists an edge due to the distortion of said image data at a boundary with said neighboring image blocks of which block distortion has been corrected by comparing a signal level difference between image data of a to-be-processed pixel located at a boundary of one block of said neighboring image blocks and image data of a pixel which is located in said one block, said one block being different from the image block of said to-be-processed pixel and in the vicinity of said to-be-processed pixel, with a reference value; and means for providing said block distortion correcting process to the recovery image data of the to-be-processed pixel only when said signal level difference is less than said reference value and before the expanding process proceeds to a next image block which has not been expanded in the predetermined order.

2. The block distortion corrector according to claim 1, further comprising:

data storage means for storing recovery image data of pixels adjacent to the to-be-corrected image block, said recovery image data being of a neighboring image block recovered before said to-be-corrected image block is recovered, said neighboring image block being adjacent to said to-be-corrected image block on which a block distortion correction processing of said recovery image data is about to be performed, and arithmetic processing means for providing an arithmetic processing for a block distortion correction processing to recovery image data of pixels located at a boundary to said neighboring image block, said pixels being of said to-be-corrected image block, using the image recovery data stored in said data storage means.

3. An image signal expander, comprising:

expanding processing means for generating recovery image data by providing an expanding processing to image data which are compressed and transmitted in units of image blocks corresponding to a prescribed number of pixels, the expanding process and the block distortion correction process being applied in a predetermined order;

a block distortion corrector for providing to said recovery image data a block distortion correction processing for correcting a distortion of recovery image data between neighboring image blocks, wherein said block distortion corrector includes edge detecting means for detecting whether or not there exists an edge due to the distortion of said image data at a boundary with said neighboring image blocks of which block distortion has been corrected by comparing a signal level difference between image data of a to-be-processed pixel located at a boundary of one block of said neighboring image blocks and image data of a pixel which is located in said one block, said one block being different from the image block of said to-be-processed pixel and in the vicinity of said to-be-processed pixel, with a reference value; and control means for providing said block distortion correcting process to the recovery image data of the to-be-processed pixel only when said signal level difference is less than said reference value and before the expanding process proceeds to a next image block which has not been expanded in the predetermined order.

4. The image signal expander according to claim 3, further comprising:

data storage means for storing recovery image data of pixels adjacent to the to-be-corrected image block, said recovery image data being of a neighboring image block recovered before said to-be-corrected image block is recovered, said neighboring image block being adjacent to said to-be-corrected image block on which a block distortion correction processing of said recovery image data is about to be performed, and arithmetic processing means for providing an arithmetic processing for a block distortion correction processing to recovery image data of pixels located at a boundary to said neighboring image block, said pixels being of said to-be-corrected image block, using the image recovery data stored in said data storage means.

5. The block distortion corrector according to claim 1, wherein said edge detecting means includes means for averaging said image data of the pixel of said one block and image data of pixels adjacent to said pixel of said one block and using a resulting averaged signal as the image data of the pixel located in said one block for determining said signal level difference.

6. The block distortion corrector according to claim 5, wherein said block distortion correcting process includes averaging said resulting averaged signal and said image data of a to-be-processed pixel.

7. The block distortion corrector according to claim 1, wherein said edge detecting means includes means for averaging said image data of the to-be-processed pixel and pixels in a to-be-processed block which are adjacent to said to-be-processed pixel and using a resulting averaged signal as the image data of a to-be-processed pixel for determining said signal level difference.

8. The block distortion corrector according to claim 7, wherein said block distortion correcting process includes averaging said resulting averaged signal and said image data of the pixel of said one block.

9. The image signal expander according to claim 3, wherein said edge detecting means includes means for averaging said image data of the pixel of said one block and image data of pixels adjacent to said pixel of said one block and using a resulting averaged signal as the image data of the pixel located in said one block for determining said signal level difference.

10. The image signal expander according to claim 9, wherein said block distortion correcting process includes averaging said resulting averaged signal and said image data of a to-be-processed pixel.

11. The image signal expander according to claim 3, wherein said edge detecting means includes means for averaging said image data of the to-be-processed pixel and pixels in a to-be-processed block which are adjacent to said to-be-processed pixel and using a resulting averaged signal as the image data of a to-be-processed pixel for determining said signal level difference.

12. The image signal expander according to claim 11, wherein said block distortion correcting process includes averaging said resulting averaged signal and said image data of the pixel of said one block.

13. A method for correcting block distortion between recovery image data and neighboring image blocks, comprising the steps of:

recovering said recovery image data by expanding compressed image data and transmitting recovered data in units of image blocks corresponding to a prescribed number of pixels, the expanding process and the block distortion correction process being applied in a predetermined order;

detecting whether or not there exists an edge due to the distortion of said image data at a boundary with said neighboring image blocks of which block distortion has been corrected by comparing a signal level difference between image data of a to-be-processed pixel located at a boundary of one block of said neighboring image blocks and image data of a pixel which is located in said one block, said one block being different from the image block of said to-be-processed pixel and in the vicinity of said to-be-processed pixel, with a reference value; and providing block distortion correcting to the recovery image data of the to-be-processed pixel located at the boundary of said neighboring image block only when said signal level difference is less than said reference value and before the expanding process proceeds to a next image block which has not been expanded in the predetermined order.

14. The method according to claim 13, further comprising:

storing recovery image data of pixels adjacent to the to-be-corrected image block, said recovery image data being of a neighboring image block recovered before said to-be-corrected image block is recovered, said neighboring image block being adjacent to said to-be-corrected image block on which a block distortion correction processing of said recovery image data is about to be performed; and arithmetic processing block distortion correction to recovery image data of pixels located at a boundary to said neighboring image block, said pixels being of said to-be-corrected image block, using the image recovery data stored by said storing step.

15. The method according to claim 13, wherein said comparing includes averaging said image data of the pixel of said one block and image data of pixels adjacent to said pixel of said one block and using a resulting averaged signal as the image data of the pixel located in said one block for determining said signal level difference.

16. The method according to claim 15, wherein said block distortion correcting includes averaging said resulting averaged signal and said image data of a to-be-processed pixel.

17. The method according to claim 13, wherein said detecting step includes averaging said image data of the to-be-processed pixel and pixels in a to-be-processed block which are adjacent to said to-be-processed pixel and using a resulting averaged signal as the image data of a to-be-processed pixel for determining said signal level difference.

18. The method according to claim 17, wherein said block distortion correcting includes averaging said resulting averaged signal and said image data of the pixel of said one block.

19. A method for expanding an image signal, comprising the steps of:

generating recovery image data by providing an expanding processing to image data which are compressed and transmitted in units of image blocks corresponding to a prescribed number of pixels, the expanding process and the block distortion correction process being applied in a predetermined order;

correcting a block distortion of recovery image data between neighboring image blocks, said correcting includes detecting whether or not there exits an edge due to the distortion of said image data at a boundary with said neighboring image blocks of which block distortion has been corrected by comparing a difference between a signal level of image data of a to-be-processed pixel located at a boundary of neighboring image block and image data of a pixel which is located in an image block different from the image block of said to-be-processed pixel and is in the vicinity of said to-be-processed pixel with a reference value; and providing said block distortion correcting process to the image data of the to-be-processed pixel located at the boundary to said neighboring image block only when said signal level difference is less than said reference value and before the expanding process proceeds to a next image block which has not been expanded in the predetermined order.

20. The method according to claim 19, further comprising:

storing recovery image data of pixels adjacent to the to-be-corrected image block, said recovery image data being of a neighboring image block recovered before said to-be-corrected image block is recovered, said neighboring image block being adjacent to said to-be-corrected image block on which a block distortion correction processing of said recovery image data is about to be performed; and arithmetic processing for a block distortion correction processing to recovery image data of pixels located at a boundary to said neighboring image block, said pixels being of said to-be-corrected image block, using the image recovery data stored by said storing step.

21. The method according to claim 19, wherein said comparing includes averaging said image data of the pixel of said one block and image data of pixels adjacent to said pixel of said one block and using a resulting averaged signal as the image data of the pixel located in said one block for determining said signal level difference.

22. The method according to claim 21, wherein said block distortion correcting includes averaging said resulting averaged signal and said image data of a to-be-processed pixel.

23. The method according to claim 19, wherein said detecting step includes averaging said image data of the to-be-processed pixel and pixels in a to-be-processed block which are adjacent to said to-be-processed pixel and using a resulting averaged signal as the image data of a to-be-processed pixel for determining said signal level difference.

24. The method according to claim 23, wherein said block distortion correcting includes averaging said resulting averaged signal and said image data of the pixel of said one block.

* * * * *